United States Patent
Folliot et al.

(10) Patent No.: US 12,462,149 B2
(45) Date of Patent: Nov. 4, 2025

(54) METHOD FOR MEMORY ALLOCATION DURING EXECUTION OF A NEURAL NETWORK

(71) Applicants: STMicroelectronics S.r.l., Agrate Brianza (IT); STMicroelectronics (Rousset) SAS, Rousset (FR)

(72) Inventors: Laurent Folliot, Gourdon (FR); Mirko Falchetto, Milan (IT); Pierre Demaj, Nice (FR)

(73) Assignees: STMicroelectronics S.r.l., Agrate Brianza (IT); STMicroelectronics (Rousset) SAS, Rousset (FR)

( * ) Notice: Subject to any disclaimer, the term of this patent is extended or adjusted under 35 U.S.C. 154(b) by 930 days.

(21) Appl. No.: 17/455,770

(22) Filed: Nov. 19, 2021

(65) Prior Publication Data

US 2022/0188610 A1 Jun. 16, 2022

(30) Foreign Application Priority Data

Dec. 16, 2020 (FR) .......................... 2013373

(51) Int. Cl.
*G06N 3/063* (2023.01)
*G06F 12/02* (2006.01)
*G06N 3/04* (2023.01)

(52) U.S. Cl.
CPC ........... *G06N 3/063* (2013.01); *G06F 12/023* (2013.01); *G06N 3/04* (2013.01); *G06F 2212/20* (2013.01)

(58) Field of Classification Search
CPC ........ G06N 3/063; G06N 3/04; G06F 12/023; G06F 2212/20; G06F 2212/1044
(Continued)

(56) References Cited

U.S. PATENT DOCUMENTS 10,417,190 B1 9/2019 Donlan
10,481,817 B2 11/2019 Doshi
(Continued)

FOREIGN PATENT DOCUMENTS

CN 101799786 A 8/2010
CN 102193868 A 9/2011
(Continued)

OTHER PUBLICATIONS

Wikipedia, "Stack" (abstract data type), available: https://web.archive.org/web/20200427214640/https://u en.wikipedia.org/wiki/Stack_(abstract_data_type), Apr. 27, 2020, 12 pages.

*Primary Examiner* — Jared I Rutz
*Assistant Examiner* — Wei Ma
(74) *Attorney, Agent, or Firm* — Slater Matsil, LLP (57) ABSTRACT

According to an aspect, a method is proposed for defining placements, in a volatile memory, of temporary scratch buffers used during an execution of an artificial neural network, the method comprising: determining an execution order of layers of the neural network, defining placements, in a heap memory zone of the volatile memory, of intermediate result buffers generated by each layer, according to the execution order of the layers, determining at least one free area of the heap memory zone over the execution of the layers, defining placements of temporary scratch buffers in the at least one free area of the heap memory zone according to the execution order of the layers.

20 Claims, 3 Drawing Sheets

(58) Field of Classification Search
USPC .......................................................... 711/147
See application file for complete search history.

(56) References Cited

U.S. PATENT DOCUMENTS

| | | |
|---|---|---|
| 2004/0158464 A1 | 8/2004 | Baker |
| 2010/0205374 A1* | 8/2010 | Meka .................... G06F 12/023 |
| | | 711/171 |
| 2017/0161604 A1 | 6/2017 | Craddock et al. |
| 2018/0088996 A1 | 3/2018 | Rossi et al. |
| 2019/0114534 A1 | 4/2019 | Teng |
| 2019/0147319 A1 | 5/2019 | Kim et al. |
| 2019/0156185 A1 | 5/2019 | Li et al. |
| 2020/0183834 A1 | 6/2020 | Folliot et al. |
| 2020/0257972 A1* | 8/2020 | Miniskar ................... G06N 3/08 |
| 2020/0302278 A1 | 9/2020 | Folliot et al. |
| 2020/0387807 A1 | 12/2020 | Stassen |

FOREIGN PATENT DOCUMENTS

| | | |
|---|---|---|
| CN | 110162338 A | 8/2019 |
| CN | 110658984 A | 1/2020 |
| CN | 111027682 A | 4/2020 |
| CN | 111052149 A | 4/2020 |
| CN | 111226230 A | 6/2020 |
| CN | 112052935 A | 12/2020 |
| EP | 3663987 A1 | 6/2020 |
| EP | 3712775 A1 | 9/2020 |
| WO | 2017095840 A1 | 6/2017 |
| WO | 2019031858 A1 | 2/2019 |

* cited by examiner

METHOD FOR MEMORY ALLOCATION DURING EXECUTION OF A NEURAL NETWORK

CROSS-REFERENCE TO RELATED APPLICATIONS

This application claims the priority to French Application No. 2013373, filed on Dec. 16, 2020, which application is hereby incorporated by reference herein in its entirety.

TECHNICAL FIELD

The present disclosure generally relates to artificial neural networks and, in particular embodiments, to the allocation of memory during the mapping of neural networks.

BACKGROUND

Artificial neural networks can be implemented by integrated circuits such as microcontrollers. Artificial neural networks generally include a succession of layers of neurons. Artificial neural networks take a set of data as input of the first layer and deliver a final result as the output of the last layer. Each layer arranged between the first layer and the last layer generates at its output a block of intermediate result data, also called tensor data. Other layers take these intermediate result data as input and generate therefrom a corresponding intermediate result data.

During the execution of the neural network, each intermediate result is temporarily stored in a memory area, called the global memory area, of a memory of the integrated circuit. However, integrated circuits have memories of limited size. It would be advantageous to limit the size required for the storage of intermediate results generated by the neural network layers.

Methods are used to define placements of intermediate result buffers in the memory during the execution of the neural network to limit the size of memory used to store intermediate results.

For example, the European patent application published under the number EP 3 663 987 or the French patent application filed under the number no 20. 04337 disclose such a method.

Besides, the execution of a layer may need to store scratch data in the memory temporarily. Scratch data are temporary intra-layer data only used by a given layer and need to be allocated only during the execution of this given layer.

For example, scratch data can be a copy of weights, layer related temporary intermediate results, or look-up tables. Scratch data can also be intra-layer data for computationally intensive tasks, such as loop unrolling. However, the temporary storage of such scratch data is generally not optimized. To minimize the inference time of the neural network, the temporary storage of scratch data generally causes RAM or flash memory penalties.

It would be advantageous to provide a method for efficiently allocating and placing scratch data.

SUMMARY

According to an aspect, a method is proposed for defining placements, in a volatile memory, of temporary scratch buffers used during execution of an artificial neural network. In accordance with an embodiment, the method includes determining an execution order of layers of the neural network, defining placements, in a heap memory zone of the volatile memory, of intermediate result buffers generated by each layer, according to the execution order of the layers. The method further includes determining at least one free area of the heap memory zone over the execution of the layers, and defining placements of temporary scratch buffers in the at least one free area of the heap memory zone according to the execution order of the layers.

In embodiments, the placements of intermediate result buffers, according to the execution order of the layers of the neural network, determine the limits of the heap memory zone needed to allocate these intermediate result buffers.

In embodiments, intermediate result buffers are allocated in the heap memory zone for as long as they are needed for the execution of a layer. Free areas in the heap memory zone appear when intermediate result buffers used for the execution of a layer have a cumulated size smaller than the size of the heap memory zone. Such a method allows the available free area of the heap memory zone used to allocate intermediate result buffers to be also used to allocate the scratch buffers.

Scratch buffers can be used for intralayer level optimizations. For example, scratch buffers are used for moving weights of the layer from flash memory to random access memory (RAM). The scratch buffers can also be used for loop unrolling for computationally intensive tasks. Using the heap memory zone's free areas to allocate scratch buffers makes it possible to optimize inference time without increasing the size of the RAM or the flash memory. The method also allows a reduction of power consumption for the execution of the neural network.

The determination of the execution order of the layers of the neural network can be performed by a depth-first search algorithm, for example, by using Directed Acyclic Graphs.

The methods disclosed by the European patent application as published under the number EP 3 663 987 or the French patent application filed under the number no 20. 04337 can be used to define the placements of intermediate result buffers in the heap memory zone.

In an embodiment, the methods includes for each layer: ordering temporary scratch buffers associated to the layer from the biggest to the smallest buffers, variable size scratch buffers being queued after the smallest buffer, and defining placements of temporary scratch buffers following their order.

In an embodiment, the defined placement of a scratch buffer is a placement of the scratch buffer at the top of the at least one free area.

In an embodiment, the defined placement of a scratch buffer is a placement of the scratch buffer at the bottom of the at least one free area.

In an embodiment, the defined placement of a scratch buffer is a placement of the scratch buffer over another scratch buffer.

In an embodiment, the method includes, for the placement of a scratch buffer: modifying a top of the heap memory zone to obtain a free area at the top of the heap memory zone having the size of the scratch buffer, and defining the placement of the scratch buffer in the free area at the top of the heap memory zone.

In an embodiment, the method includes, for the placement of a scratch buffer: modifying a bottom of the heap memory zone to obtain a free area at the bottom of the heap memory zone having the size of the scratch buffer, placing the scratch buffer in the free area at the bottom of the heap memory zone.

In an embodiment, placement for scratch buffers with variable sizes are defined in at least one remaining free area of the heap memory zone after defining the placements of the scratch buffers with fixed sizes. Advantageously, when there are several remaining free areas available for the placement of a scratch buffer with a variable size, the largest free area of these remaining free areas is selected for placing this scratch buffer.

Preferably, the method includes: storing the free areas for a layer in a list, and updating the list after each placement definition of a scratch buffer.

In an embodiment, a computer program product is proposed comprising instructions that, when the program is executed by a computer, cause the computer to carry out the above-mentioned method.

In an embodiment, an integrated circuit is proposed having: a non-volatile memory configured to store a neural network, a volatile memory, and a processor. The processor is configured to determine an execution order of layers of the neural network, define placements of intermediate result buffers generated by each layer in a heap memory zone of the volatile memory according to the execution order of the layers, determine at least one free area of the heap memory zone over an execution of the layers, and define placements of temporary scratch buffers in the at least one free area of the heap memory zone according to the execution order of the layers.

In an embodiment, the processor is also configured to, for each layer: order temporary scratch buffers associated to the layer from the biggest to the smallest buffers, variable size scratch buffers being queued after the smallest buffer, and define placements of temporary scratch buffers following their order.

In an embodiment, the processor is configured to define a placement of a scratch buffer at the top of the at least one free area.

In an embodiment, the processor is configured to define a placement of a scratch buffer at the bottom of the at least one free area.

In an embodiment, the processor is configured to define a placement of a scratch buffer over another scratch buffer.

Advantageously, the processor is configured to, for the placement of a scratch buffer: modify a top of the heap memory zone so as to obtain a free area at the top of the heap memory zone having the size of the scratch buffer, and define the placement of the scratch buffer in the free area at the top of the heap memory zone.

In an embodiment, the processor is configured to, for the placement of a scratch buffer: modify a bottom of the heap memory zone so as to obtain a free area at the bottom of the heap memory zone having the size of the scratch buffer, and place the scratch buffer in the free area at the bottom of the heap memory zone.

Preferably, the processor is configured to define a placement for scratch buffers with a variable size in at least one remaining free area of the heap memory zone, after defining the placements of the scratch buffers with a fixed size. Advantageously, when there are several remaining free areas available for the placement of a scratch buffer with a variable size, the processor is configured to select the largest free area of these remaining free areas for placing this scratch buffer.

In an embodiment, the processor is configured to store the free areas for a given layer in a list, update the list after each placement definition of a scratch buffer.

BRIEF DESCRIPTION OF THE DRAWINGS

Other advantages and features of the invention will appear in the detailed description of embodiments and implementations, in no way restrictive, and the attached drawings in which.

DETAILED DESCRIPTION OF ILLUSTRATIVE EMBODIMENTS

Figure 1:
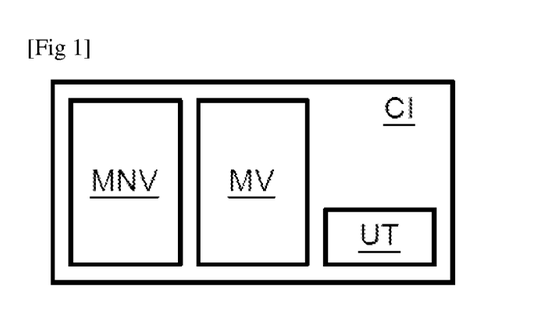
FIG. 1 is a block diagram of an embodiment integrated circuit.

FIG. 1 shows an integrated circuit (CI). This integrated circuit (CI) may for example be a microcontroller, a code generator or any other object that may contain an on-board or hardware software architecture.

The integrated circuit (CI) is configured to implement a neural network. The neural network includes a succession of layers.

The integrated circuit (CI) includes a non-volatile memory (MNV) configured to store the various parameters defining the architecture of a neural network, like the configuration of its layers and its weights and parameters.

The integrated circuit (CI) also includes a volatile memory (MV), for example a RAM memory (for "Random Access Memory"). The volatile memory (MV) is configured to store an execution code of the neural network as well as a program for executing the neural network. The volatile memory (MV) also includes a zone, called heap memory zone, which can be dynamically allocated for the storage of data used during the execution of the neural network. As will be detailed below, these data can be intermediate results generated by layers or scratch buffers data used for the execution of a given layer.

The heap memory zone may present a faster memory part and a slower memory part. Accesses to the faster memory part are executed faster than the accesses to the slower memory part.

The integrated circuit (CI) also includes a processor (UT). The processor (UT) includes, for example, a microprocessor. The processor (UT) is coupled to the volatile memory (MV). The processor is configured to allocate the heap memory zone of the volatile memory (MV) to store data during the execution of the neural network.

To optimize the allocation of memory during the execution of these neural networks, a method for defining placements for buffers in the volatile memory is implemented before the execution of the network.

The processor (UT) is configured to implement such a method. In particular, the processor (UT) can execute a computer program comprising instructions that, when the program is executed by the processor, cause the processor to carry out the method.

Figure 2:
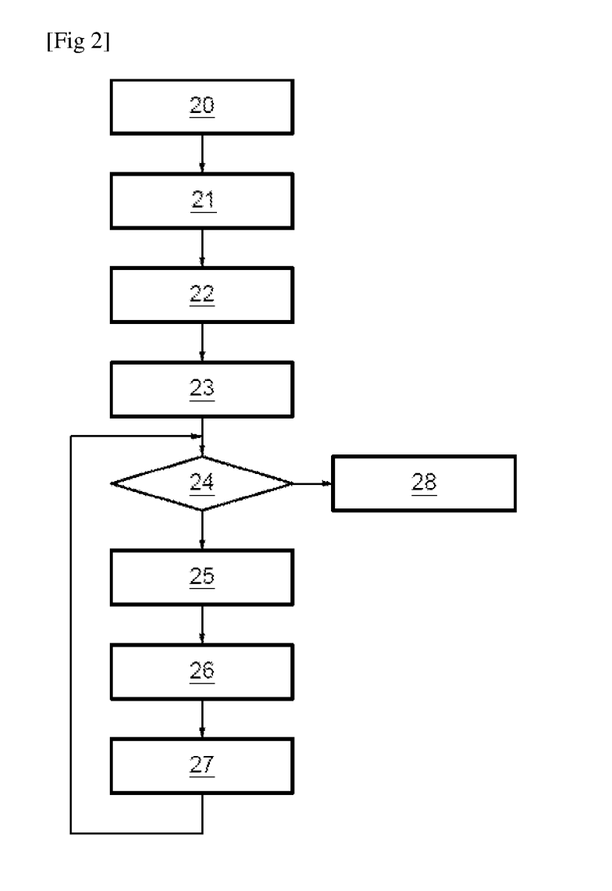
FIG. 2 is a flow diagram of an embodiment method.

The method is shown in FIG. 2. The method includes a step 20 in which the processor (UT) determines an execution order of the layers of the neural network. This allows an execution schedule of the layers of the neural network to be obtained.

More particularly, the determination of the execution order of the layers of the neural network can be performed by a depth-first search algorithm by, for example, using Directed Acyclic Graphs, well known to a person skilled in the art.

Then, the method includes a step 21, in which, according to the execution order of the layers, the processor (UT) defines placements in memory of intermediate result buffers, also called tensor buffers.

In particular, intermediate result buffers are used to store intermediate results, also called tensor data. Intermediate results are data that are computed by each layer, except the last layer, from data received at the input of the layer. The intermediate results computed by a layer are delivered on the output of this layer and are used by other layers executed afterwards. Intermediate results need to be stored in memory until the layers that use them are executed. The definition of placements of intermediate result buffers allows optimization of the size of the heap memory zone of the volatile memory, needed to store intermediate results.

In particular, the methods disclosed by the European patent application published under the number EP 3 663 987 or the French patent application filed under the number no 20. 04337 can be used to define the placements of intermediate result buffers in the heap memory zone.

Figure 3:
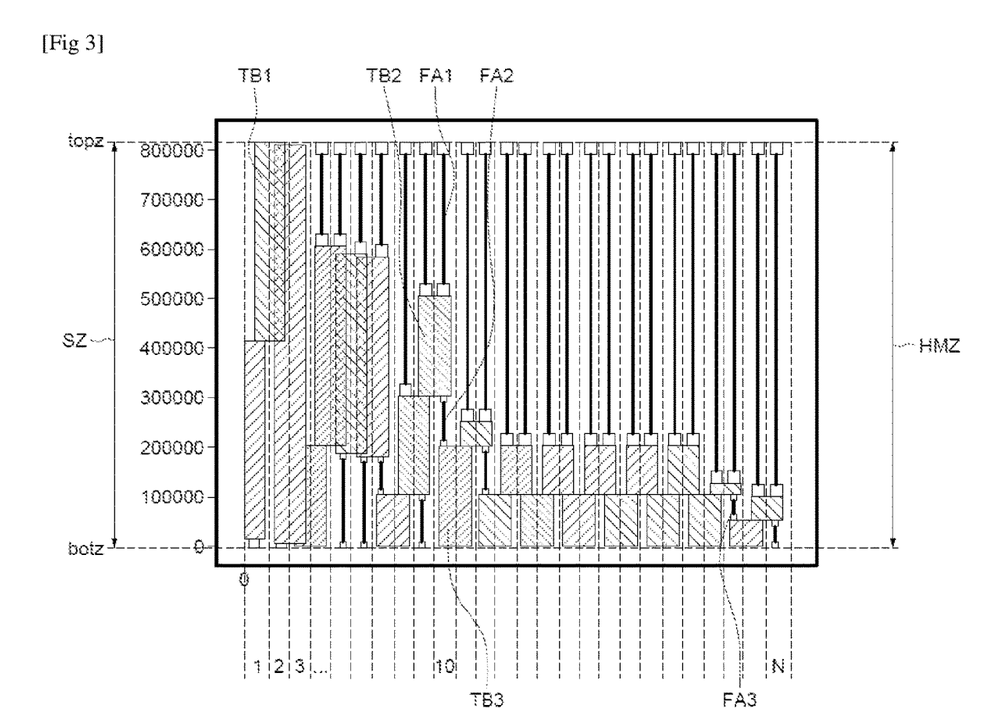
FIG. 3 is a diagram of an embodiment intermediate result buffer placements over time.

FIG. 3 shows intermediate result buffer placements over time for each layer. FIG. 3 shows on the y-axis (ordinate) placement of intermediate result buffers in the heap memory zone (HMZ) and on the x-axis (abscissa) execution time as a result of the processing of layers 1 to N.

For example, intermediate result buffers TB1, TB2, TB3 are placed in the heap memory zone during the execution times of some layers.

The size of the heap memory zone (HMZ) is defined by the placements chosen for the intermediate result buffers. For example, in FIG. 3, the size sz of the heap memory zone is equal to sz=topz−botz, where topz is the top address of the heap memory zone, and botz is the bottom address of the heap memory zone. As shown, the full size of the heap memory zone is not completely allocated during the execution of most of the layers. Some areas of the heap memory zone are free during the execution of most of the layers. For example, in FIG. 3, areas FA1, FA2, FA3 are free.

The method takes advantage of the free areas of the heap memory zone to allocate temporary scratch buffers. In particular, the method allows the definition of temporary scratch buffer placement in the heap memory zone.

Scratch buffers can be used for storing scratch data for layer level optimizations. In embodiments, scratch buffers are used for moving weights of the layer from a flash memory to a RAM. In some embodiments, scratch buffers can also be used for loop unrolling for computationally intensive tasks.

Scratch data are defined for the execution of a given layer of the neural network. Thus, each scratch buffer is associated with a given layer of the neural network.

Scratch buffers may have a fixed size or a variable size. A variable scratch buffer is a scratch buffer having an unknown size before the execution of the neural network. A scratch buffer with a variable size can necessitate a minimum size or not.

In particular, the method includes step 22, in which the processor (UT) determines the free areas of the heap memory zone over the execution of the layers. More particularly, free areas of the heap memory zone are determined for the execution time of each layer.

For example, in FIG. 3, to proceed with the execution of the 10th layer, the processor (UT) needs the data stored in the intermediate result buffers TB2 and TB3. These intermediate result buffers occupy only a given area in the heap memory zone. Thus, areas FA1 and FA2 are free at the execution time of the 10th layer. In embodiments, the determined free areas are stored in a list.

Then, the method includes a process for defining placements of temporary scratch buffers in the free areas of the heap memory zone according to the execution order of the layers. The placements of temporary scratch buffers are performed one by one according to the execution schedule of the layers.

In particular, at step 23, temporary scratch buffers to place are stored in a queue according to the execution schedule. In embodiments, the temporary scratch buffers associated with the same layer are stored in the queue from the biggest to the smallest, scratch buffers having a variable size being queued after the smallest scratch buffer. As will be described below, after defining the placement of a scratch buffer, this scratch buffer is deleted from the queue.

The process for defining placements of scratch buffers includes step 24, in which the processor (UT) checks whether the queue is empty or not. If the queue is not empty, this means that there is still at least one scratch buffer to place. In this case, the next step is step 25.

If the queue is empty, this means that there are no scratch buffers to place. In this case, the method ends at step 28.

When the queue is not empty, at step 25, the processor (UT) recovers the first scratch buffer in the queue to place it in the heap memory zone.

In particular, at step 26, the processor (UT) checks the free areas of the heap memory zone available at the execution time of the layer associated with the scratch buffer recovered at step 25. This check is performed from the list of free areas available at the execution time of the layer.

Then, at step 27, the processor (UT) defines placement of the scratch buffer according to its constraints and allowable moves.

Figure 4:
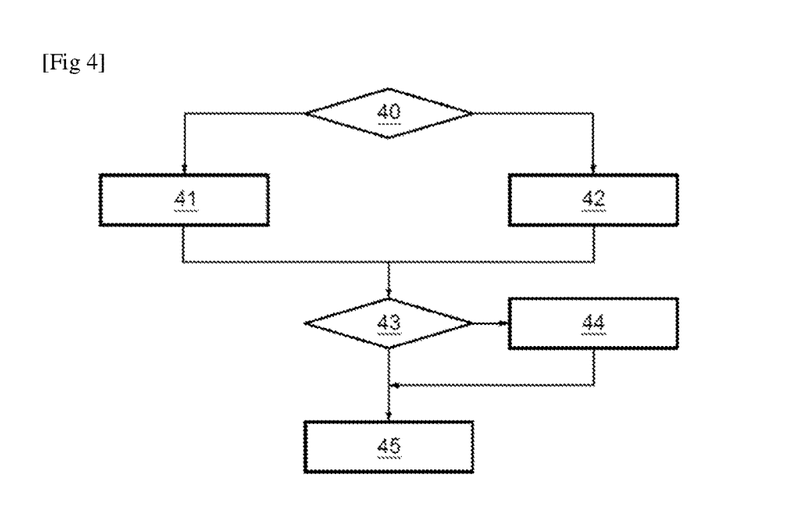
FIG. 4 is a flow diagram of an embodiment method.

A process for defining the placement of a scratch buffer in the heap memory zone is shown in FIG. 4.

More particularly, at step 40, the processor (UT) checks whether a latency optimization is needed for the scratch buffer. If a latency optimization is needed, the processor (UT) selects at step 41 the faster memory part of the heap memory zone as the part of the heap memory zone in which the scratch buffer will be placed. Next, the processor (UT) extracts the free areas of the faster memory part from the list of free areas according to the execution time of the layer associated to the scratch buffer.

If latency optimization is not needed, the processor (UT) selects at step 42 the slower memory part of the heap memory zone as the part of the heap memory zone in which the scratch buffer will be placed. Next, the processor (UT) extracts the free areas of the slower memory part from the list of free areas according to the execution time of the layer associated to the scratch buffer.

Then, at step 43, the processor (UT) evaluates whether it is possible to place the scratch buffer in the extracted free areas from the list.

In particular, the processor (UT) compares the size of the scratch buffer to the size of each extracted free area from the list. When an extracted free area has a size greater than or equal to the size of the scratch buffer, this extracted free area is adapted to receive the scratch buffer.

If there is at least one free area adapted to receive the scratch buffer, the processor (UT) proceeds directly with step 44 in which the processor (UT) defines the placement of the scratch buffer.

If there are no free areas adapted to receive the scratch buffer, at step 44, the processor (UT) increases the size of the part of the heap memory zone in which the scratch buffer has to be placed.

In embodiments, the processor (UT) increases the top or the bottom of the heap memory zone to obtain a free area at the top or at the bottom of the heap memory zone with a size adapted to receive the scratch buffer.

In embodiments, when there are no free areas at the top, respectively at the bottom, of the global memory size, the processor (UT) modifies the top address, respectively the bottom address, of the heap memory zone so as to obtain a free area with a size equal to the size of the scratch buffer.

However, when there is a free area at the top, respectively at the bottom, of the heap memory zone, the processor (UT) modifies the top address, respectively the bottom address, so as to increase the size of the free area by the difference between the size of the scratch buffer and the initial size of the free area.

Then, the processor (UT) proceeds with step 45. At step 45, the processor (UT) defines the placement of the scratch buffer. In embodiments, if the scratch buffer has a fixed size, the processor (UT) selects the smallest free area extracted from the list, with a size adapted to receive the scratch buffer, to place the scratch buffer. Then, the processor (UT) can place the scratch buffer with a fixed size according to different possible placements.

A first placement for a fixed size scratch buffer consists in placing, for minimizing final heap size and when specific layer implementation requests that, the scratch buffer to be overlaid with another scratch buffer for the execution of the layer. In embodiments, the scratch buffer is placed over a scratch buffer already placed with a size greater than or equal to the scratch buffer to place. The scratch buffer can also be placed over a scratch buffer already placed with a size smaller than the scratch buffer to place when there is a free area adjacent to the scratch buffer already placed, the free area having a size greater than or equal to the difference between the scratch buffer to place and the scratch buffer already placed. In embodiments, this free area is a free area adjacent to the bottom of the scratch buffer already placed.

A second placement for a fixed size scratch buffer consists of placing the scratch buffer at the top of the smallest free area with a size adapted to receive the scratch buffer.

A third placement for a fixed size scratch buffer consists of placing the scratch buffer at the bottom of the smallest free area with a size adapted to receive the scratch buffer.

In embodiments, when all the possible placements of scratch buffers with fixed sizes associated with the same layer are defined, the processor proceeds with the definition of the placements of scratch buffers with variable sizes associated with the same layer.

For placing a scratch buffer with a variable size, the processor (UT) selects the largest set of free areas which remains from the list to place the scratch buffer. In embodiments, the remaining free areas are sorted by decreasing size.

If the number of scratch buffers with variable size to place is less than or equal to the number of remaining free areas, each scratch buffer can be placed in a given remaining free area sorted in decreasing size order. In this case, the defined size of the scratch buffer is equal to the size of the remaining free area in which the scratch buffer is placed.

However, if the number of scratch buffers with variable size to place is greater than the number of remaining free areas, the processor computes an average of number of scratch buffers to place in a remaining free area. Thus, a scratch buffer with a variable size can be placed in a remaining free area with at least one other scratch buffer with a variable size. In embodiments, the defined size of the scratch buffer to place is equal to the size of the remaining free area in which the scratch buffer is placed divided by the number of scratch buffers to place in this remaining free area.

Moreover, in case a scratch buffer with variable size needs a minimum size greater than the size of each remaining free area. It is possible, at step 44, to increase the top or the bottom of the heap memory zone to obtain a free area at the top or at the bottom of the heap memory zone with a size equal to the minimum size needed for this scratch buffer. Then, the scratch buffer is placed in this free area.

Following the placement of the scratch buffer, the list of free areas is updated, and the scratch buffer is deleted from the queue.

Then, the process is repeated from step 24 for placing the next scratch buffer in the queue, until the queue is empty. When the queue is empty, there are no more scratch buffers to place. The method ends at step 28.

Nevertheless, the process for defining placement of scratch buffers can be repeated to try different placements for each scratch buffer. This allows optimized placements to be found for the scratch buffers. In particular, the placements can be optimized according to a given criterion. For example, the criterion can be to avoid the increase of the heap memory zone defined by the placements of the intermediate result buffers. Another criterion can be to keep the placement solution allowing the minimal size of heap memory zone to be obtained. Alternatively, another criterion can be to keep the placement solution allowing the least fragmented memory zone to be obtained. Another criterion could be to keep the placement solution allowing to maximize the placements of scratch buffers in the faster memory part of the heap memory zone to speed-up the execution of the neural network.

Figure 5:
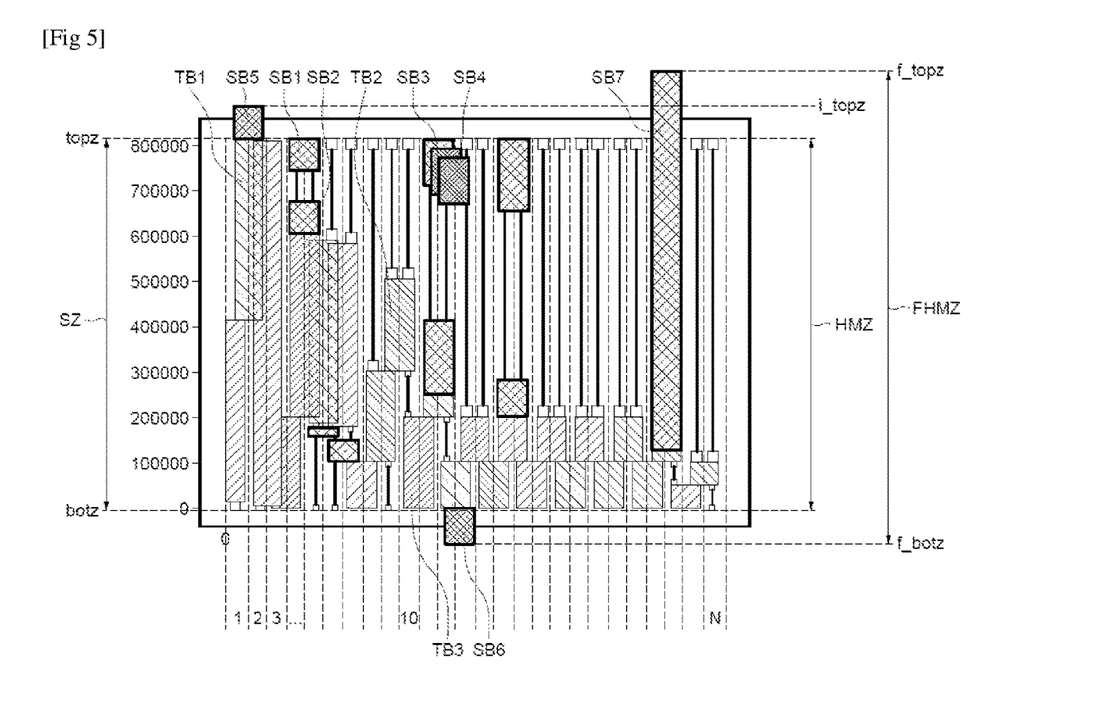
FIG. 5 is a diagram of an embodiment placement of intermediate result buffers and scratch buffer.

An example of a final solution for placements of intermediate result buffers and scratch buffers is shown in FIG. 5. The placements of intermediate result buffers are the same as in FIG. 3 (e.g., buffers TB1, TB2, and TB3). Thus, the placements of the intermediate result buffers define a heap memory zone between addresses botz and topz.

In embodiments, some scratch buffers are placed at the top or at the bottom of some free areas. For example, a scratch buffer SB1 is placed at the top of a free area. A scratch buffer SB2 is placed at the bottom of a free area.

In embodiments, some other scratch buffers are placed over scratch buffers already placed. For example, a scratch buffer SB3 is placed over a scratched buffer already placed at the top of a free area. Another scratch buffer SB4 is placed over the scratch buffer SB3.

In embodiments, for placing some scratch buffers when there are no free areas available, the top or the bottom of the heap memory zone are increased.

For example, for placing the scratch buffer SB5, the address of the top of the heap memory zone is increased to the address i_topz, so as to obtain a free area of the size of the scratch buffer SB5 at the top of the heap memory zone. Then, the scratch buffer SB5 is placed in this free area.

Besides, for placing the scratch buffer SB6, the address of the bottom of the heap memory zone is modified to the address f_botz, to obtain a free area of the size of the scratch buffer SB6 at the bottom of the heap memory zone. Then, the scratch buffer SB6 is placed in this free area.

To place the scratch buffer SB7, the top of the heap memory zone is increased to the address f_topz because the size of the free area at the top of the heap memory zone defined before the placement of scratch buffer SB6 is smaller than the scratch buffer SB7. In embodiments, the top of the heap memory zone is increased by the difference between the size of the scratch buffer SB7 and the size of the free area at the top of the heap memory zone defined before the placement of scratch buffer SB7.

In the end, the final heap memory zone FHMZ is defined between the address f_topz and the address f_botz.

After defining the placements of the intermediate result buffers and scratch buffer, the processor (UT) can execute the neural network. When the processor (UT) executes the neural networks, the memory is allocated according to the defined placements of intermediate result buffers and to the defined placements of scratch buffers.

The above-mentioned method allows usage of the available free area of the heap memory zone used to allocate intermediate result buffers to, in turn, allocate the scratch buffers.

By using the free areas of the heap memory zone to allocate scratch buffers, it is possible to optimize inference time without almost impacting the size of the RAM or the flash memory.

The method also allows the reduction of the power consumption for the execution of the neural network.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method, comprising:
   determining an execution order of layers of an artificial neural network;
   defining, in a heap memory zone of a volatile memory, a placement of an intermediate result buffer generated by each layer in accordance with the execution order of the layers;
   determining a free area of the heap memory zone for an execution of each layer;
   defining, in the free area of the heap memory zone, a placement of a temporary scratch buffer based on the execution order of the layers;
   ordering the temporary scratch buffer associated with a respective layer from a largest buffer to a smallest buffer; and
   queuing variable size scratch buffers after the smallest buffer before defining the placement of the temporary scratch buffer.

2. The method of claim 1, wherein defining the placement comprises defining the placement of the temporary scratch buffer at a top of the free area of the heap memory zone.

3. The method of claim 1, wherein defining the placement comprises defining the placement of the temporary scratch buffer at a bottom of the free area of the heap memory zone.

4. The method of claim 1, wherein defining the placement comprises defining the placement of the temporary scratch buffer in place of another temporary scratch buffer.

5. The method of claim 1, further comprising:
   modifying, for the placement of the temporary scratch buffer, a top of the heap memory zone to obtain a free area at the top of the heap memory zone having the size of the temporary scratch buffer; and
   defining, for the placement of the temporary scratch buffer, the placement of the temporary scratch buffer in the free area at the top of the heap memory zone.

6. The method of claim 1, further comprising:
   modifying, for the placement of the temporary scratch buffer, a bottom of the heap memory zone to obtain a free area at the bottom of the heap memory zone having the size of the temporary scratch buffer; and
   defining, for the placement of the temporary scratch buffer, the placement of the temporary scratch buffer in the free area at the bottom of the heap memory zone.

7. The method of claim 1, wherein defining the placement comprises defining the placement of the temporary scratch buffer with variable sizes in a remaining free area of the heap memory zone after defining the placement of the temporary scratch buffer having a fixed size.

8. The method of claim 1, further comprising:
   storing the free area of the heap memory zone in a list; and
   updating the list after each placement definition of the temporary scratch buffer.

9. The method of claim 1, wherein the intermediate result buffer stores output data from one layer, the output data being provided as input data for a subsequent layer, and wherein the temporary scratch buffer stores calculation data used internally within execution of a single layer and deleted after completing the execution of the single layer.

10. A non-transitory computer-readable media storing computer instruction, that when executed by one or more processors, cause the processor to perform:
    determining an execution order of layers of an artificial neural network;
    defining, in a heap memory zone of a volatile memory, a placement of an intermediate result buffer generated by each layer in accordance with the execution order of the layers;
    determining a free area of the heap memory zone for an execution of each layer;
    defining, in the free area of the heap memory zone, a placement of a temporary scratch buffer based on the execution order of the layers;
    ordering the temporary scratch buffer associated with a respective layer from a largest buffer to a smallest buffer; and
    queuing variable size scratch buffers after the smallest buffer before defining the placement of the temporary scratch buffer.

11. The non-transitory computer-readable media storing computer instruction of claim 10, wherein defining the placement comprises defining the placement of the temporary scratch buffer at a top of the free area of the heap memory zone.

12. The non-transitory computer-readable media storing computer instruction of claim 10, wherein defining the placement comprises defining the placement of the temporary scratch buffer at a bottom of the free area of the heap memory zone.

13. The non-transitory computer-readable media storing computer instruction of claim 10, wherein defining the placement comprises defining the placement of the temporary scratch buffer in place of another temporary scratch buffer.

14. The non-transitory computer-readable media storing computer instruction of claim 10, that when the executed by one or more processors, cause the processor to perform:
   modifying, for the placement of the temporary scratch buffer, a top of the heap memory zone to obtain a free area at the top of the heap memory zone having the size of the temporary scratch buffer; and
   defining, for the placement of the temporary scratch buffer, the placement of the temporary scratch buffer in the free area at the top of the heap memory zone.

15. The non-transitory computer-readable media storing computer instruction of claim 10, wherein the intermediate result buffer stores output data from one layer, the output data being provided as input data for a subsequent layer, and wherein the temporary scratch buffer stores calculation data used internally within execution of a single layer and deleted after completing the execution of the single layer.

16. An integrated circuit, comprising:
   a non-volatile memory storage comprising an artificial neural network instruction;
   a volatile memory storage; and
   a processor coupled to the non-volatile memory storage and the volatile memory storage, wherein the processor is configured to execute the artificial neural network instructions to:
      determine an execution order of layers of an artificial neural network,
      define, in a heap memory zone of the volatile memory storage, a placement of an intermediate result buffer generated by each layer in accordance with the execution order of the layers,
      determine a free area of the heap memory zone for an execution of each layer,
      define, in the free area of the heap memory zone, a placement of a temporary scratch buffer based on the execution order of the layers,
      order the temporary scratch buffer associated with a respective layer from a largest buffer to a smallest buffer, and
      queue variable size scratch buffers after the smallest buffer before defining the placement of the temporary scratch buffer.

17. The integrated circuit of claim 16, wherein defining the placement comprises defining the placement of the temporary scratch buffer at a top of the free area of the heap memory zone.

18. The integrated circuit of claim 16, wherein defining the placement comprises defining the placement of the temporary scratch buffer at a bottom of the free area of the heap memory zone.

19. The integrated circuit of claim 16, wherein defining the placement comprises defining the placement of the temporary scratch buffer in place of another temporary scratch buffer.

20. The method of claim 16, wherein the intermediate result buffer stores output data from one layer, the output data being provided as input data for a subsequent layer, and wherein the temporary scratch buffer stores calculation data used internally within execution of a single layer and deleted after completing the execution of the single layer.

* * * * *